(12) United States Patent
Miu et al.

(10) Patent No.: US 11,976,799 B2
(45) Date of Patent: May 7, 2024

(54) ANTI-GLARE VEHICLE HEADLIGHTS

(71) Applicant: MAGNA CLOSURES INC., Newmarket (CA)

(72) Inventors: Traian Miu, Newmarket (CA); Gabriele Wayne Sabatini, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 17/793,251

(22) PCT Filed: Jan. 12, 2021

(86) PCT No.: PCT/CA2021/050024
§ 371 (c)(1),
(2) Date: Jul. 15, 2022

(87) PCT Pub. No.: WO2021/142535
PCT Pub. Date: Jul. 22, 2021

(65) Prior Publication Data
US 2023/0056771 A1     Feb. 23, 2023

Related U.S. Application Data

(60) Provisional application No. 62/962,368, filed on Jan. 17, 2020.

(51) Int. Cl.
*F21S 41/64* (2018.01)
*F21W 102/165* (2018.01)
*F21W 107/10* (2018.01)

(52) U.S. Cl.
CPC ...... *F21S 41/645* (2018.01); *F21W 2102/165* (2018.01); *F21W 2107/10* (2018.01)

(58) Field of Classification Search
CPC .............. F21S 41/645; F21W 2107/10; F21W 2102/165
See application file for complete search history.

(56) References Cited

U.S. PATENT DOCUMENTS 7,815,350 B2   10/2010   Valcamp et al.
10,883,687 B2   1/2021   Zozgomik
(Continued)

FOREIGN PATENT DOCUMENTS

AT       517306 B1    8/2017
CN    209944222 U    1/2020
(Continued)

*Primary Examiner* — Thomas M Sember
(74) *Attorney, Agent, or Firm* — Dickinson Wright PLLC

(57) ABSTRACT

A vehicle headlight has a segmented light guide device in which segments are selectively controlled to operate in an output state that reduces glare to oncoming vehicle drivers. Vehicle sensors and controller circuitry are used to identify areas of glare removal in the light pattern of the headlight and control the corresponding segments in the light guide device to operate in a selected light output state that reduces glare. The segments can be operated in a focused output state for vehicle driver visibility, or in a scattered output state to reduce glare. The segments can be operated in a clear or transparent output state for vehicle driver visibility, or in a reflected output state to reduce glare. Reflected light can optionally be re-directed. The light guide device can employ bi-stable liquid crystal shuttering or liquid crystal switchable mirror technology.

15 Claims, 12 Drawing Sheets

(56) References Cited

U.S. PATENT DOCUMENTS

| | | |
|---|---|---|
| 2006/0018511 A1 | 1/2006 | Stam et al. |
| 2009/0257113 A1 | 10/2009 | Smith |
| 2011/0084609 A1 | 4/2011 | Kawagachi et al. |
| 2014/0268837 A1* | 9/2014 | Simchak ............... F21S 41/645 362/465 |
| 2015/0092392 A1 | 4/2015 | Woelfing et al. |
| 2018/0073700 A1 | 3/2018 | Orisich et al. |
| 2018/0253609 A1 | 9/2018 | Potter et al. |
| 2018/0272931 A1 | 9/2018 | Salter et al. |
| 2019/0094668 A1 | 3/2019 | Holzinger |
| 2019/0161001 A1 | 5/2019 | Lahmer |
| 2019/0195457 A1 | 6/2019 | Toko et al. |
| 2019/0277469 A1 | 9/2019 | Yagi |
| 2019/0390836 A1 | 12/2019 | Hirata et al. |
| 2020/0086918 A1 | 3/2020 | Solar |
| 2022/0299184 A1 | 9/2022 | Traian |

FOREIGN PATENT DOCUMENTS

| | | |
|---|---|---|
| CN | 106200219 B | 3/2021 |
| EP | 2979926 A1 | 2/2016 |
| KR | 20180121262 A | 11/2018 |
| WO | 2017115778 A1 | 7/2017 |
| WO | 2018108744 A1 | 6/2018 |

* cited by examiner

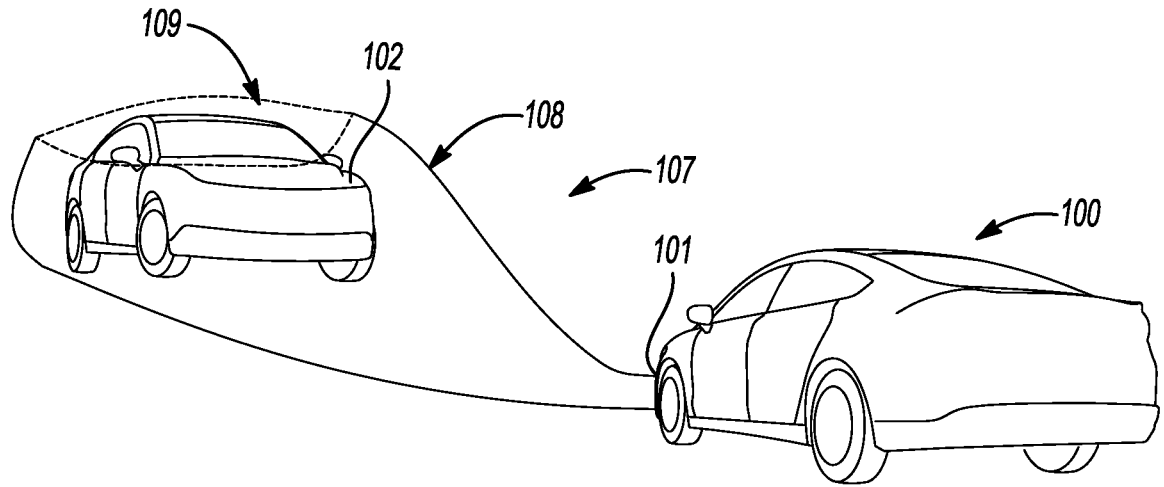
Fig-1
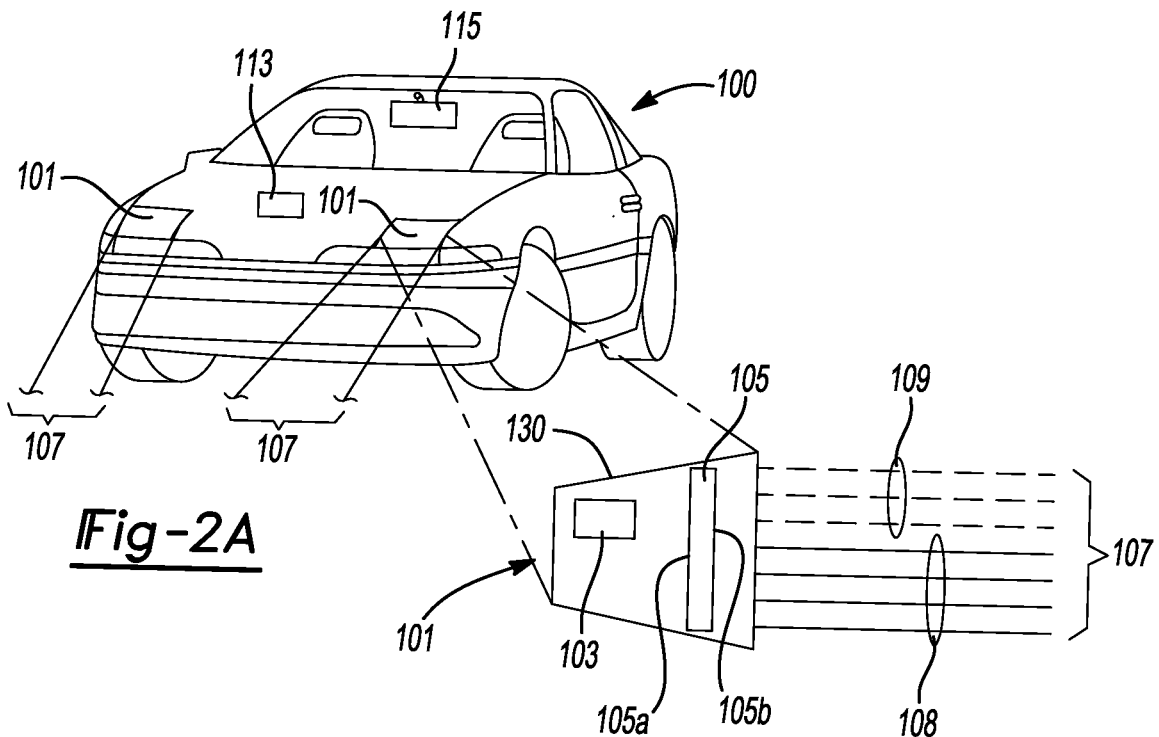
Fig-2A
Fig-2B

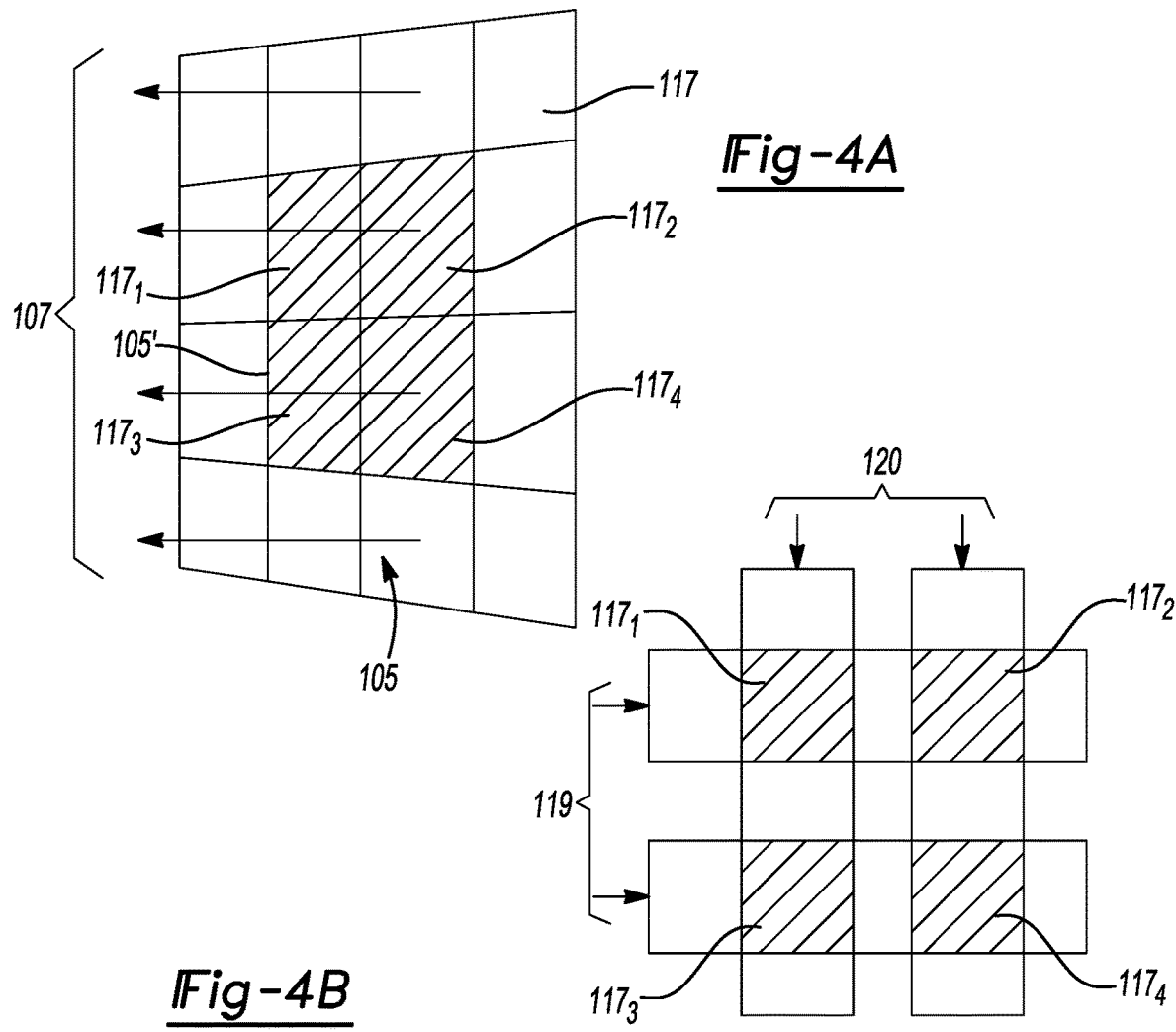
*Fig-4A*
*Fig-4B*
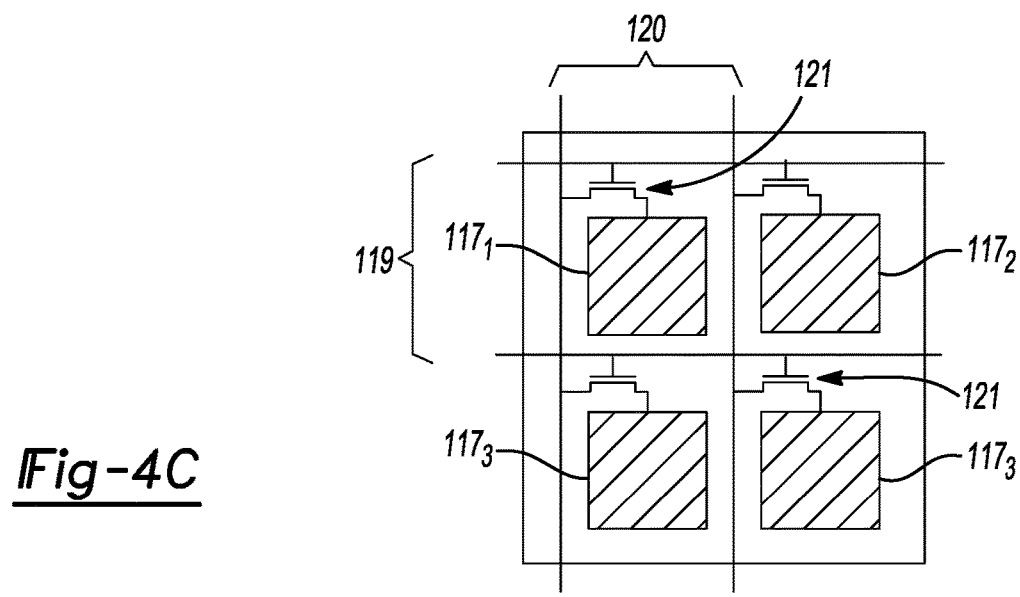
*Fig-4C*

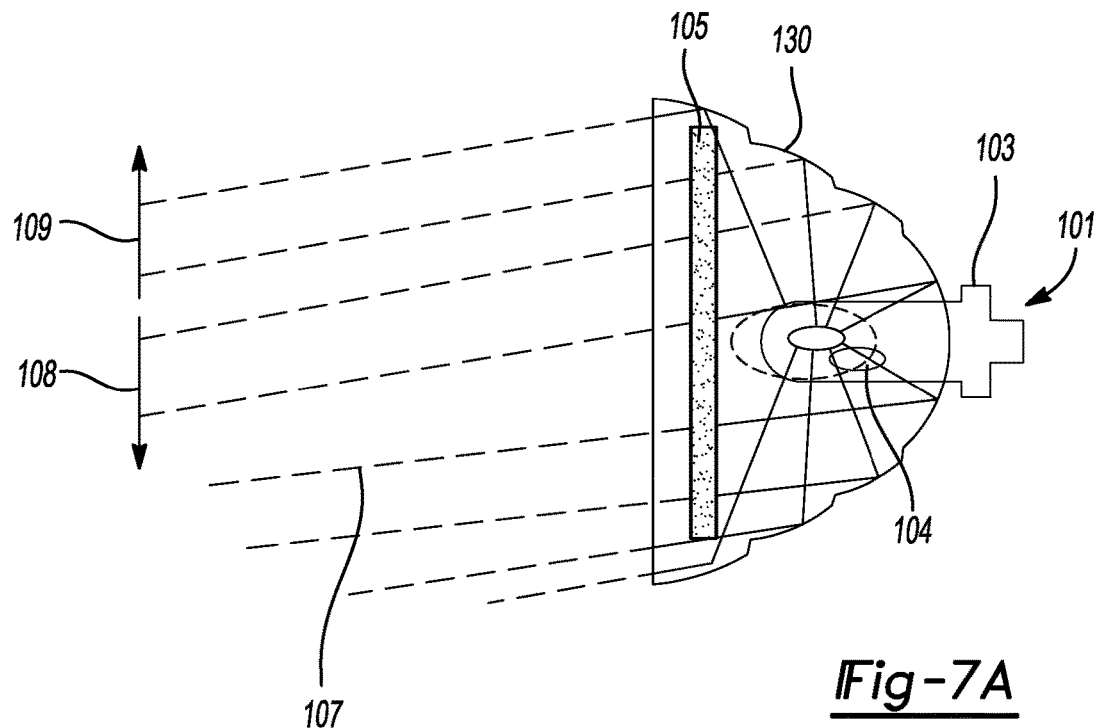
*Fig-7A*
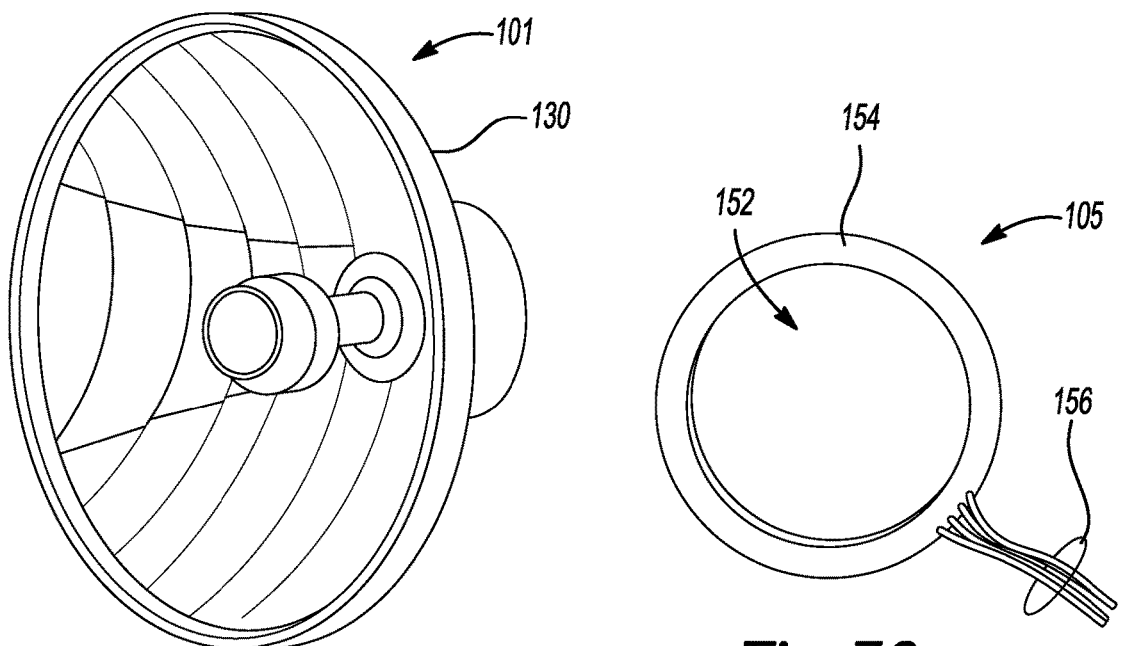
*Fig-7B*
*Fig-7C*

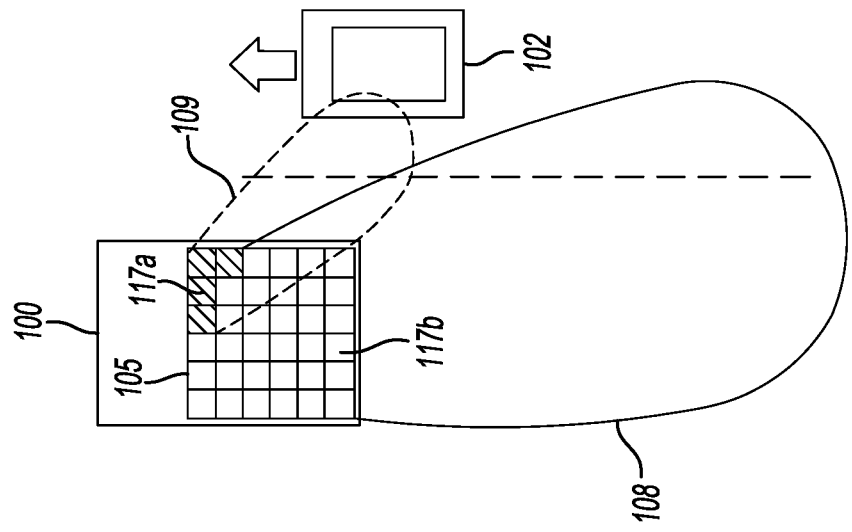
_Fig-13C_
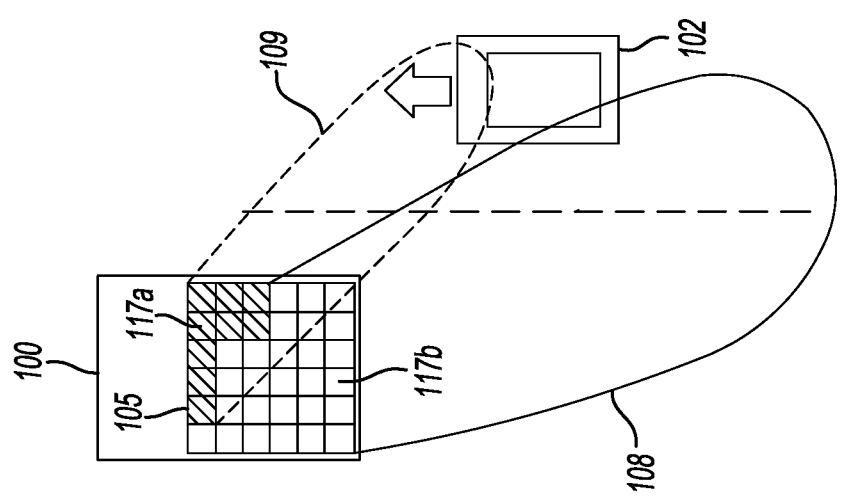
_Fig-13B_
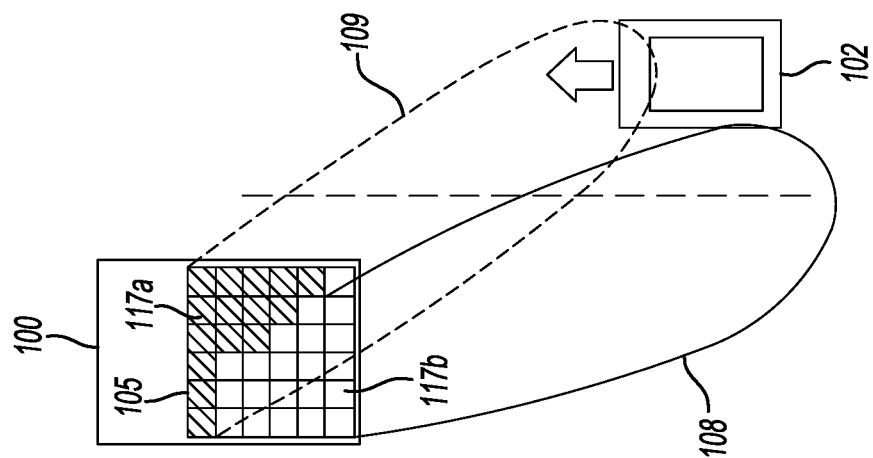
_Fig-13A_

ANTI-GLARE VEHICLE HEADLIGHTS

CROSS-REFERENCE TO RELATED APPLICATIONS

This application is a U.S. National Stage of International Application No. PCT/CA2021/050024, filed on Jan. 12, 2021, which claims the benefit of U.S. Provisional Application Ser. No. 62/962,368, filed on Jan. 17, 2020, which are both incorporated herein by reference in their entirety.

FIELD

The present disclosure relates to generally to vehicle headlights having controllable elements to reduce glare perceived by oncoming vehicle drivers.

BACKGROUND

Motor vehicle headlights have shifted from using incandescent lamps and high intensity discharge lamps (e.g., xenon electrical gas-discharge lamps) to using more electrically efficient light emitting diode (LED) lamps. LED lamps typically provide greater lumens for less electrical energy, e.g., by producing less infrared or red bandwidth light as well as less heat. However, LED lamps provide a wide light beam and are susceptible to producing unwanted glare for oncoming motor vehicle drivers. Headlights using other types of lamp technologies can also generate unwanted glare for oncoming motor vehicle drivers.

SUMMARY

This section provides a general summary of the present disclosure and is not a comprehensive disclosure of its full scope or all of its features, aspects and objectives.

In accordance with an example embodiment, an anti-glare headlight is provided that comprises a light source configured to generate light; and a segmented light guide device in which segments receive light from the light source and are controllable to selectively operate in one of at least two output states to emit light from the vehicle headlight, the output states chosen from an anti-glare output state and another output state that is different from the anti-glare output state.

In accordance with aspects of example embodiments, the segmented light guide device comprises liquid crystal material between two transparent substrates that can emit received light in the anti-glare output state when subjected to a first voltage level, and in the other output state when subjected to a different second voltage level In accordance with aspects of example embodiments, the segments are arranged in a matrix by an addressing matrix of electrodes. The addressing matrix is operable to supply any respective one of the segments with a voltage level chosen from the first voltage level and the second voltage level depending on whether a signal is received that indicates that received light emitted from that segment is in a glare removal area identified in a light pattern produced by the headlight.

In accordance with aspects of example embodiments, segments in the segmented light guide are each configured to emit received light as scattered light when in the anti-glare output state, and as collimated light when in the other output state.

In accordance with aspects of example embodiments, segments in the segmented light guide are each configured to reflect received light when in the anti-glare output state, and emit received light when in the other output state.

In accordance with aspects of example embodiments, the segmented light guide is configured to redirect reflected light for emission toward an area in the light pattern produced by the headlight that is outside the glare removal area.

In accordance with aspects of example embodiments, the light source is chosen from a light bulb, a laser, and an array of light emitting diodes.

In accordance with an example embodiment, a method of operating a vehicle headlight is provided that comprises placing a segmented liquid crystal light guide device in the optical path of a light source in the vehicle headlight, the segmented liquid crystal light guide device having segments that receive light from the light source; identifying segments in the segmented liquid crystal light guide device that emit received light in a glare removal area in a light pattern of the vehicle headlight; and controlling the identified segments to emit the received light in an anti-glare output state, and controlling other ones of the segments in the segmented liquid crystal light guide device to emit the received light in another output state that is different from the anti-glare output state.

In accordance with aspects of example embodiments, the method further comprises emitting the received light as scattered light when in the anti-glare output state, and as collimated light when in the other output state.

In accordance with aspects of example embodiments, the method further comprises reflecting the received light when in the anti-glare output state, and emitting the received light when in the other output state.

In accordance with aspects of example embodiments, further comprises redirecting the reflected light for emission toward an area in the light pattern produced by the headlight that is outside the glare removal area.

The above aspects of the disclosure describe a vehicle lamp system including solid state light sources and controllable elements to controllably beam form the light emitted from the light sources.

It will be appreciated that any of the aspects of this summary can be combined with other aspects in this summary as well as with the various embodiments described below.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 1 illustrates a vehicle with anti-glare headlight and improved light pattern in accordance with an example embodiment for reducing glare for an oncoming vehicle;

FIG. 2A illustrates a vehicle with anti-glare headlight in accordance with an example embodiment;

FIG. 2B illustrates an anti-glare headlight and improved light pattern in accordance with an example embodiment;

FIGS. 4A, 4B and 4C, and FIGS. 5A and 5B, each illustrate a portion of a light guide device for a headlight in accordance with an example embodiment;

FIG. 7A illustrates a cross-sectional diagram of a reflector-based optics headlight with a light guide device and improved light pattern in accordance with an example embodiment;

FIGS. 7B and 7C illustrate, respectively, a perspective view of the reflector-based optics headlight, and a front view of the light guide device in FIG. 7A;

FIGS. 13A, 13B and 13C illustrate example operation of segments in a light guide device changing states, in accordance with an example embodiment, as an oncoming vehicle approaches and passes to provide improved light pattern.

DETAILED DESCRIPTION OF EXAMPLE EMBODIMENTS

Figure 3:
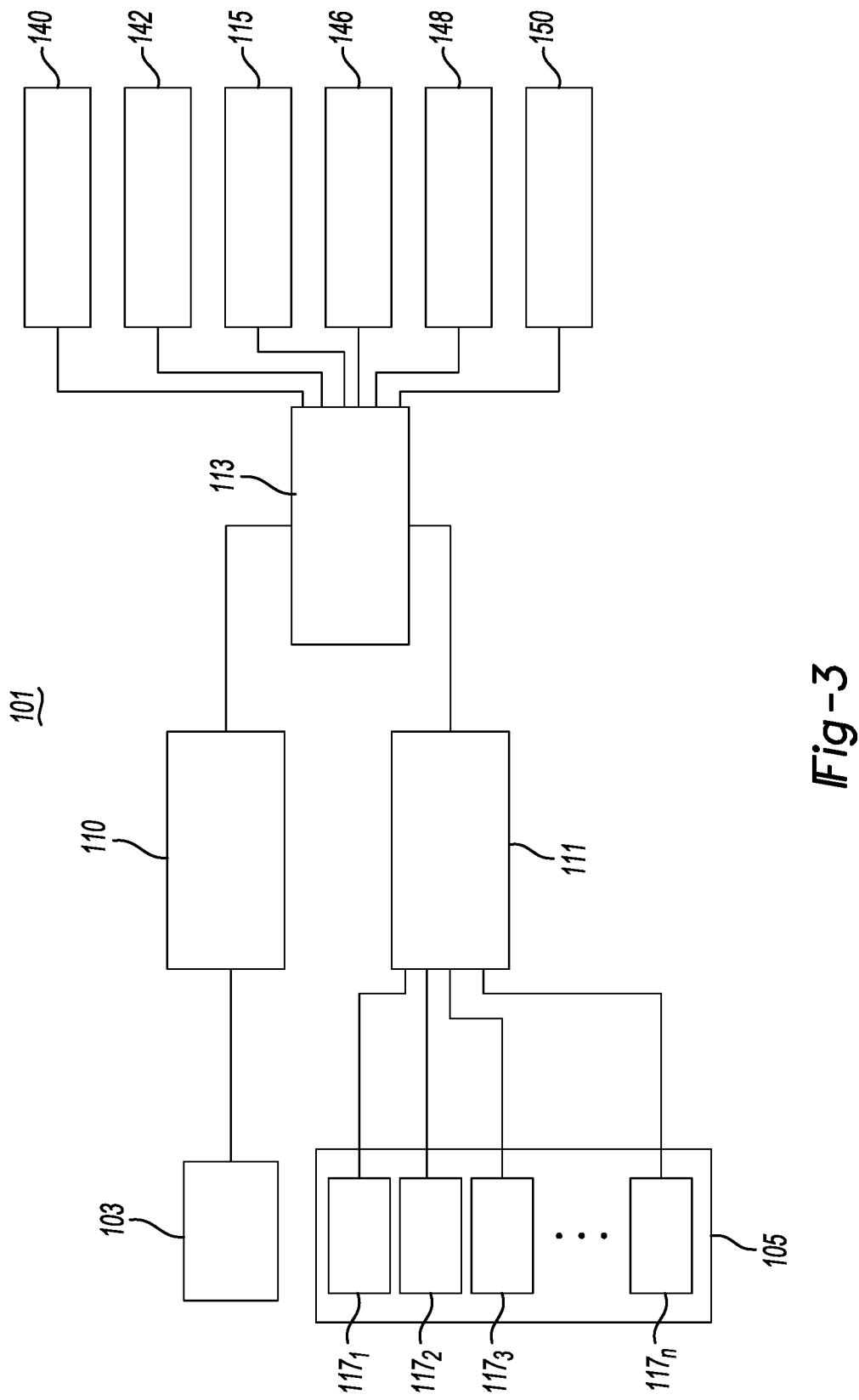
FIG. 3 is a block diagram of a vehicle control system in accordance with an example embodiment.

In general, example embodiments of vehicle lighting are described below, e.g., anti-glare headlights having respective different types of light sources and a light guidance device to reduce glare for oncoming vehicle drivers in accordance with the teachings of the present disclosure. With reference to FIG. 1, reducing glare to an oncoming vehicle 102 driver from a headlight 101 in a vehicle 100 is advantageous because the possibility of collisions with the oncoming vehicle 102 due to poor visibility of the oncoming vehicle 102 driver are also reduced. FIG. 1 illustrates a vehicle 100 with anti-glare headlight 101 and improved light pattern 107 in accordance with an example embodiment for reducing glare for an oncoming vehicle 102 driver. Although the vehicle 100 is generally equipped with two headlights 101, only one headlight 101 and its associated light pattern 107 are shown in FIG. 1 for clarity. The light pattern 107 produced by the anti-glare headlight 101 in accordance with illustrative embodiments is improved to provide an area 108 of focused, collimated light to provide good lighting and therefore visibility for the vehicle 100 driver and, when needed, an area 109 of scattered light that causes less glare to an oncoming vehicle 102 driver.

The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the present disclosure. In some example embodiments, well-known processes, well-known device structures, and well-known technologies are not described in detail, as they will be readily understood by the skilled artisan in view of the disclosure herein.

FIG. 2A shows a schematic view of a vehicle 100 with anti-glare headlights 101 and respective partial light patterns 107 configured and operated in accordance with example embodiments. The vehicle 100 can include one or more headlights 101 that emit light to illuminate the region in front of the vehicle. The headlights 101 can illuminate the roadway as well as structures, such as oncoming vehicles, roadway, road signs, and so on, in front of the vehicle. The vehicle 100 can include one or more light sensor(s) 115, which can sense the ambient light and light from oncoming vehicles 102, e.g., reflected light from the headlights 101 or light emitted by the oncoming vehicle 102. The light sensor 115 can send light-related information in an electrical signal to a vehicle body control module (BCM) 113. The BCM 113 is in electrical communication with the light sensor 115 and a light guide device 105 is provided in each anti-glare headlight 101 as illustrated in FIG. 2B. The BCM 113 can process the light information signals from the light sensor 115 to control operation of the light source 103 and light guide device 105, e.g., through control signals to a light controller 110 and a light guide controller 111, respectively, as described in connection with FIG. 3. For example, the BCM 113 can be configured (e.g., programmed) to determine which parts of a light pattern 107 being produced by an anti-glare headlight 101 are to be a focused light area 108 or a scattered light area 109 based on sensing and differentiation of the passenger area of an oncoming vehicle 102 due to different reflection and transparency properties of light sensed with respect to windshield and window glass surrounding parts of an operator/passenger compartment relative to body materials of the oncoming vehicle (e.g., sheet metal, and other opaque materials).

FIG. 2B depicts a schematic of an anti-glare headlight 101 and improved light pattern 107 in accordance with an example embodiment. The anti-glare headlight 101 comprises a housing 130 enclosing at least one light source 103 and a light guide device 105. Either one or both of the light controller 110 and the light guide controller 111 can be provided in the headlight 101 or in another part of the vehicle 101. The light guide device 105 is configured to be controlled by the light guide controller 111 to alter rays of light output from the light source 103 (e.g., and optionally reflected by the housing 130 interior based on the type of light source 103) that strike a first, input surface 105a and that emerge from a second, output surface 105b to produce a selected light pattern 107, depending on conditions sensed by the light sensor 115 and optionally other conditions sensed by other sensors or received as vehicle control inputs. As described below with reference to FIGS. 4A through 4C and FIGS. 5A and 5B, the light guide device 105 can comprise a plurality of individually controllable segments 117 that can alter inputted rays of light via selective refraction or scattering or reflection, for example, to output rays of light that contribute to a selected light pattern 107 having selected area(s) 108 of focused, collimated light that provides good lighting and therefore visibility for the vehicle 100 driver, and/or area(s) 109 of scattered light that causes less glare to an oncoming vehicle 102 driver.

FIG. 3 is a block diagram of a vehicle control system in accordance with an example embodiment. FIG. 3 shows the light controller 110 and the light guide controller 111 as part of an anti-glare headlamp 101. As stated above, the light controller 110 and/or the light guide controller 111 can also be deployed in another part of the vehicle 100. The light controller 110 and the light guide controller 111 can be connected to the BCM 113 via a vehicle communication channel(s), e.g., wiring or a controller area network (CAN) bus. The light controller 110 controls operation of each light source(s) 103. As described below, the light source(s) 103 can be a selected type of light bulb(s) with or without a lens or projector, a laser, a D-optic light emitting diode (LED)-type light, among other types of light sources. The light controller 110 can controllably operate the light source(s) 103 to emit light or not, for example. The light guide controller 111 controls operation of the light guide device 105 to control the output of the rays of light received from the light source 103, and optionally reflected by a housing 130, to form a selected light pattern 107 for the headlight 101. For example, the light guide controller 111 can control segments $117_1, \ldots, 117_n$ of the light guide device 105 that are organized into a two-dimension matrix or array to selectively scatter rays of light striking its corresponding portion of the input surface 105a, or reflect these rays of light so that they are redirected to other segments, or otherwise refract and redirect the rays of light, to form the desired light pattern 107 that reduces any undesirable glare for an oncoming vehicle 102 driver or any undesirable reflection and glare that could be perceived by the vehicle 101 driver.

With continued reference to FIG. 3, the BCM 113 sends control signals to both the light controller 110 and the light guide controller 111. The BCM 113 includes processing circuitry that is operably connected to an integral and/or separate memory device with respect to the BCM 113. Task instructions for the BCM are stored in a memory device and loaded to the processing circuitry. The BCM 113 receives sensed input values from one or more various vehicle sensors or other input devices such as a steering angle sensor 140, a camera 142, light sensor(s) 115, a speed sensor 146, a LIDAR 148, driver settings 150, among others, for example. Based on these received input values, the BCM 113 applies the instructions to generate control signal inputs for the light controller 110 and the light guide controller 110, which in turn apply their own instructions to generate control signals applied to the light(s) 103 and the light guide 105, respectively.

Figure 6A:
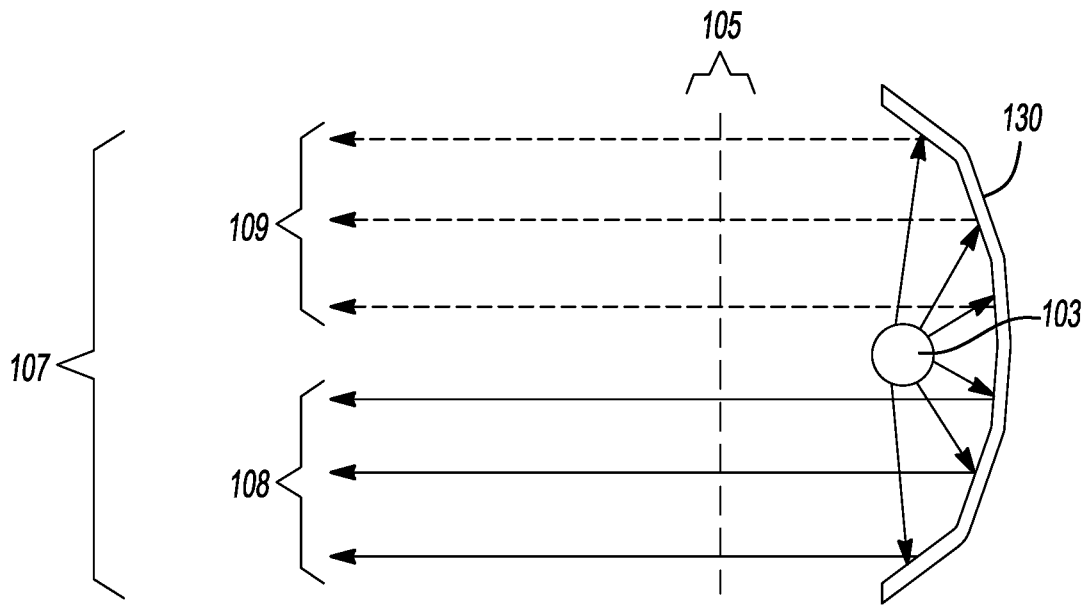
FIGS. 6A and 6B each illustrate an improved light pattern from an anti-glare headlight in accordance with an example embodiment.

The light guide device 105 is described below with reference to two implementations illustrated in FIGS. 6A and 6B, respectively. In accordance with a first implementation illustrated by FIG. 6A, the light guide device 105 is configured to selectively operate in focused or scattered output states. Light rays from the light source 103 strike an input surface 105a of a light guide device 105 having respective segments 117. The light guide controller is configured to selectively control respective segments 117 of the light guide device 105 to operate in a focused output state or in a scattered output state, whereby the segments 117 output their inputted light rays as either focused, collimated light 108 or scattered light 109, depending on sensed conditions. Although not depicted in FIG. 6A, it is to be understood that this first implementation can also be used for an LED-type light source 103, laser-type light source 103 or other light source 103 that does not employ a reflector housing 130 as depicted in FIG. 6A.

Figure 6B:
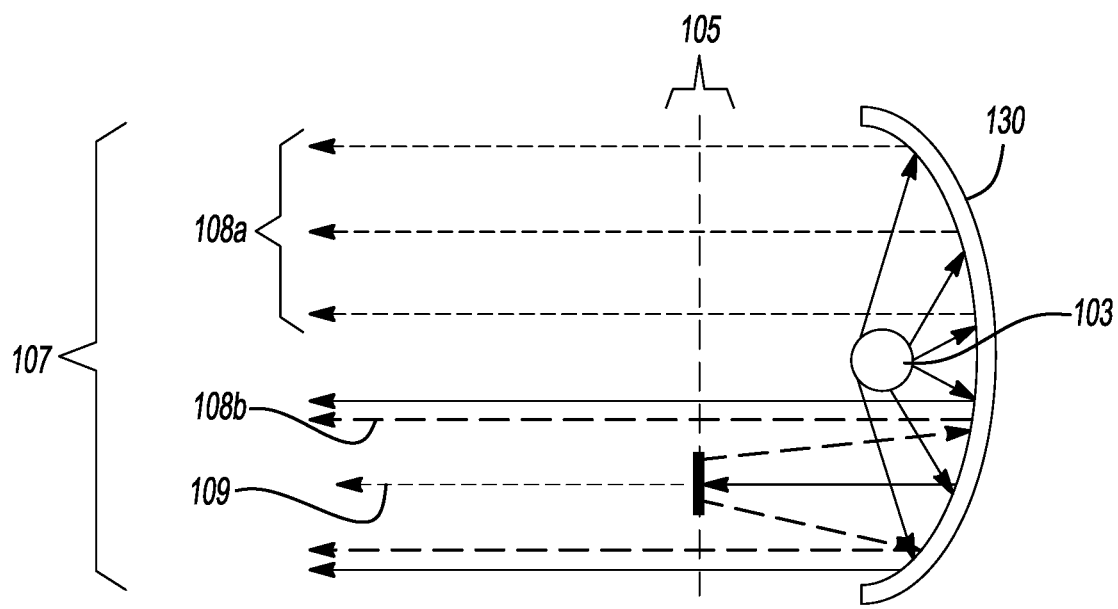

In accordance with a second implementation illustrated by FIG. 6B, the light guide device 105 is configured to selectively operate in clear output state for focused light 108a or a reflective output state for reflected and optionally recycled light 108b and possibly partially transmitted light 109. For example, in areas of the light pattern 107 in which it is desirable to reduce glare, corresponding segments 117 in light guide device 105 can be controlled to reflect their inputted light rays from the light source 103 back towards a reflector in the housing 130. The reflected rays can then be recycled by redirecting them to illuminate other areas in the light pattern 107 as indicated at 108b. Thus, the light guide device 105 reflects and recycles these light rays for better visibility, instead of these light rays being blacked out and not directed on the road at all. The remaining segments 117 in the light guide device 105 can be controlled to operate in the clear output state as indicated at 108a since the BCM 113 has determined that their associated light inputs would not affect the glare on an oncoming vehicle 102 driver.

An LED-type light source 103 or other type of light source that has no reflector in its housing 130 can also employ clear or reflective output states in accordance with the second implementation but does not perform the above-described recycling of inputted light rays. In one possible configuration, the LED-type light source 103 includes an array of LEDS, such as a matrix of LEDs where each LED of the array of LEDs may be individually addressable and controllable, such as individually controlled to turn on or off, or to emit light at an intensity level between on and off. Each of the LEDs part of the array of LEDs may be associated with each of the segments 117, for example in a one to one relationship, such that the associated LED and segment 117 may be each individually controlled at the same time to control the light output from the single LED, for example to vary the intensity of scattered or diffused light. Or, one or more of the LEDs part of the array of LEDs may be associated with one of the segments 117 such that the one or more LEDs and the single segment 117 may be each individually controlled at the same time to control the light output from the one or more LEDs. Or, one or more of the segments 117 may be associated with one of the LEDs part of the array of LEDs such that the one or more LED and associated single segment 117 may be each be controlled at the same time to control the light output from the one or more LEDs. Other variations without limitation are possible. Such a light source can be operated with a light guide device 105 that is controlled to reflect light rays from selected segments 117 using liquid crystal switchable mirror technology described below, for example, to reduce glare. When the BCM 113 determines that light rays from certain segments 117 of the light guide device 105 may contribute to glare in the light pattern 107, these segments 117 are controlled to operate in the reflective output state to reduce glare. The remaining segments 117 in the light guide device 105 are controlled to operate in the clear output state since the BCM 113 has determined that their associated light inputs would not affect the glare on an oncoming vehicle 102 driver.

Figure 5A:
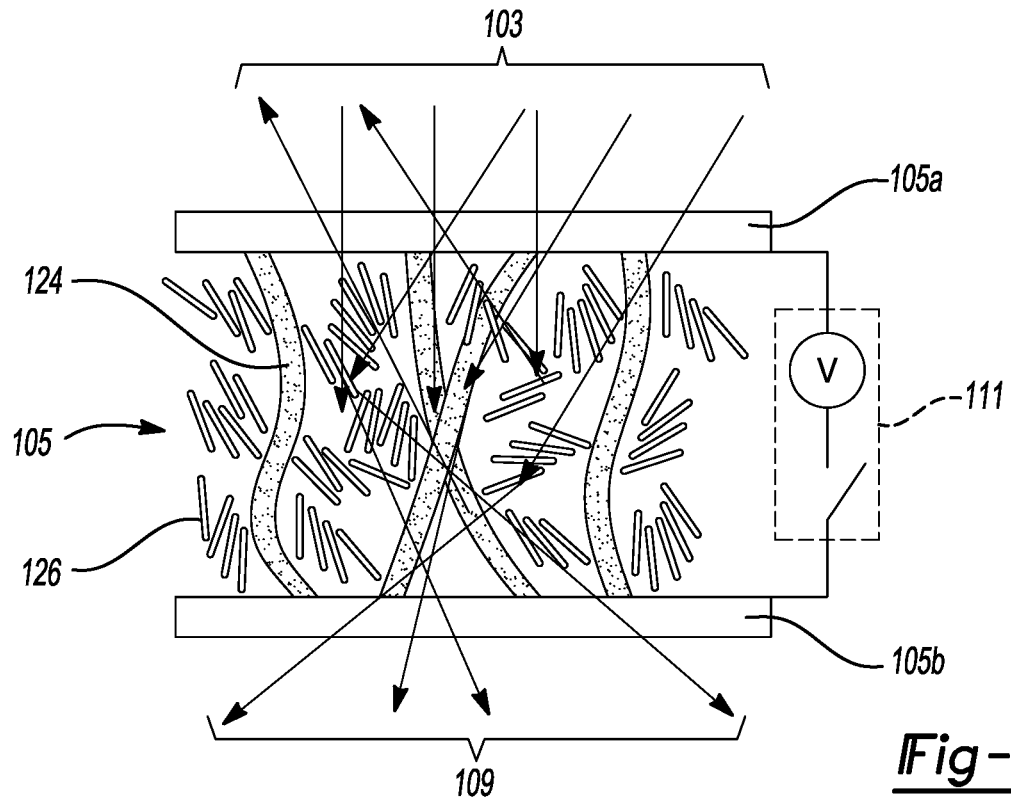
Figure 5B:
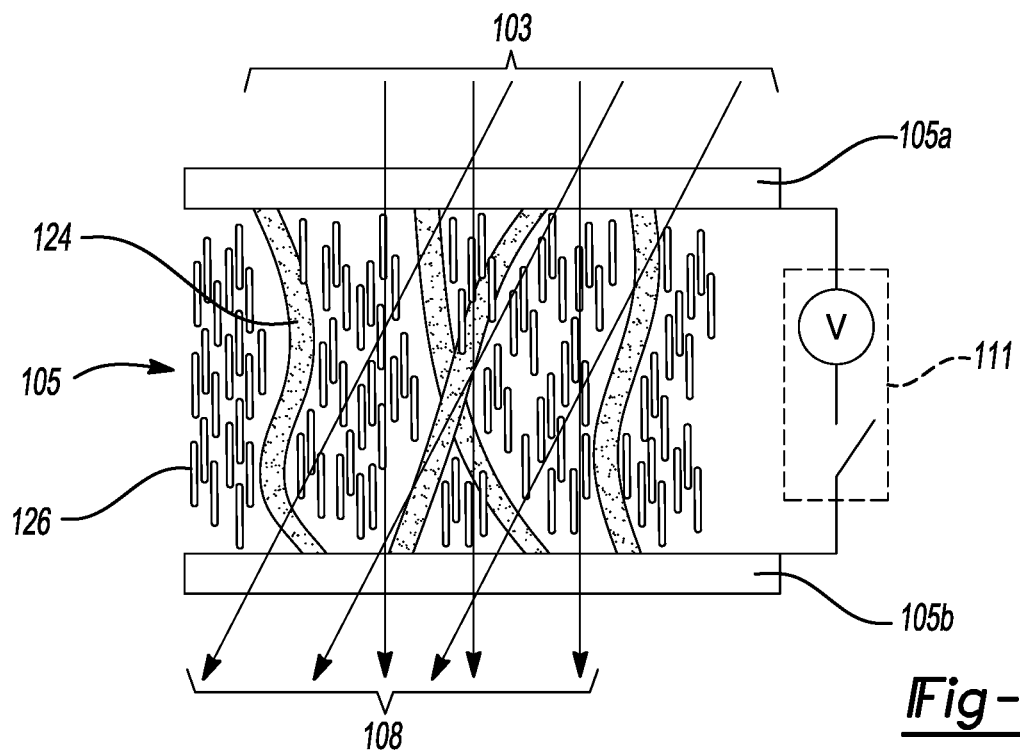

The example technology to implement these two implementations will now be described with reference to FIGS. 4A through 4C and FIGS. 5A and 5B. For example, to achieve selective operation in a scattered light 109 output state or in a focused or collimated light 108 output state in accordance with the first implementation described with reference to FIG. 6A, the liquid guide device 105 can employ bi-stable liquid crystal shutter technology. The light guide device 105 can be configured as a planar device, as illustrated in FIG. 4A, having liquid crystals 126 placed in a polymer network 124 between surfaces 105a and 105b, as illustrated in FIGS. 5A and 5B. An example encapsulated polymer stabilized cholesteric texture (EPSCT) light shutter is described in U.S. Pat. No. 9,835,894 of Deng-Ke Yang et al. (assigned to Kent State University), which is incorporated herein by reference. In the absence of an electric field, the liquid crystals 126 are placed in the poly-domain focal conic texture, as shown in FIG. 5A, such that the refractive index is varied in space causing the EPSCT material to be highly light scattering. The scattering of light is mainly caused by the abrupt refractive index change between the domains of the liquid crystals 126. When a sufficiently high voltage is applied across an EPSCT segment 117, as shown in FIG. 5B, the helical structure of the liquid crystals (with $\Delta\varepsilon>0$) is unwound, and the liquid crystals 126 are more uniformly aligned parallel to the polymer network 124, causing the EPSCT light shutter effect in that segment 117 which therefore becomes transparent for collimated light from an emitter matrix or other light source 103.

To achieve selective operation in a clear output state for focused light 108 or in a reflective state for reflected and optionally recycled light in accordance with the second implementation described with reference to FIG. 6B, the liquid guide device 105 can employ liquid crystal switchable mirror technology. As stated above, the light guide device 105 can be configured as a planar device, as illustrated in FIG. 4A, having liquid crystals 126 (e.g., cholesteric crystals) placed between transparent surfaces 105a and 105b. An example liquid crystal switchable mirror implementation is described in U.S. Pat. No. 9,046,730 of Le Li et al. (assigned to Kent Optronics Inc.), which is incorporated herein by reference. Optical states of respective portions or segments 117 of the liquid crystals 126 produce a clear or reflective optical state (e.g., chosen from all optical states that can be produced by the liquid crystal, which can range from any combination of broadband reflection, tunable narrow band reflection, light scattering, and transparency) in accordance with an amount of voltage applied across the cholesteric crystal.

FIG. 4A shows a portion of a light guide device 105 that comprises a matrix or grid of sixteen segments 117 for illustrative purposes. It is to be understood that the number of segments 117 (e.g., pixels) in the light guide device 105 can be on the order of hundreds or thousands, for example. The number of segments 117 provided in a light guide device 105, or granularity of control of segments 117 in a light guide device 105, can depend on the type of light source 103 used and desired light pattern 107 that is to be generated therefrom, materials used in light guide device 105, among other factors. Voltage can be selectively applied to these segments 117 using passive or active matrix addressing, for example. For illustrative purposes, four of the segments 117 indicated at 105' in FIG. 4A are shown in FIGS. 4B and 4C with a portion of a passive matrix and a portion of an active matrix, respectively. A passive matrix as shown in FIG. 4B uses a grid of column or vertical wire electrodes 120 and row or horizontal wire electrodes 119 to address the segments 117 by altering the electrical charge at a given intersection, one column or row at a time. The corresponding segment 117n at the given intersection is only active while it is addressed (e.g., provided with a selected voltage). An active matrix as shown in FIG. 4C uses a grid of vertical and horizontal wire electrodes 119, 120 to address a thin film transistor (TFT) driving circuit 121 provided to the segments 117 at their respective intersections. The TFT circuit 121 for each segment 117 contains a capacitor that stores energy used to drive the segment 117. The segments 117 are addressed one column or row at a time. Due to the capacitor, the segment 117 stays active after it is addressed and until it is addressed again.

Example headlights 101 that use a light guide device 105 and different types of light technologies 103 will now be described with reference to FIG. 7A through FIG. 11C. The light guide device 105 is a segmented liquid crystal device that is placed in the optical path of a headlight 101. The light guide device 105 illustrated in FIGS. 7C, 8C, 9C, 10B and 11C is configured as a round, planar device having liquid crystal material portion 152 comprising liquid crystal material with electrode addressing matrix provided between two transparent or clear substrates, an optional frame 154 that can be partial or entirely enclose the liquid crystal material portion 152, and wire(s) 156 for providing control voltages to the electrode addressing matrix. It is to be understood that the light guide device 105 can have different shape than shown, and different dimensions depending on the headlight in which it is used.

For example, if the headlight 101 uses the first implementation described above, the light guide device 105 can be implemented as a segmented liquid crystal device 105 that functions as a bi-stable light scattering device. For example, the segmented liquid crystal device 105 can employ the bi-stable crystal shutter technology described above or other technology to provide similar controlled light output states. The liquid crystal device 105 can variably switch each segment 117 (e.g., pixel) from a clear output state to a light scattering output state. Information from a camera 142 and/or lidar 148 and/or radar sensor is used to identify areas of glare removal in the light pattern 107 of the headlight and the corresponding segments or pixels 117 that are to be switched or otherwise controlled to scatter the light inputted to them. Passive matrix addressing is preferred with a bi-stable device 105 since it is simpler to implement and there is no need to keep the pixel active after addressing. Also, active matrix devices may disturb the optical path.

If the headlight 101 uses the second implementation described above, the segmented liquid crystal device 105 can employ the liquid crystal switchable mirror technology described above or other technology to provide similar controlled light output states. The liquid crystal device 105 can variably switch each segment 117 (e.g., pixel) from a clear output state to a reflective output state. Information from a camera 142 and/or lidar 148 and/or radar sensor is used to identify areas of glare removal in the light pattern 107 of the headlight and the corresponding segments or pixels 117 that are to be switched or otherwise controlled to reflect all or part of the light back into the optical system. Such blocked or dimmed light can be optionally recycled back into the optical system; therefore, the light is not wasted but redirected to illuminate other areas for the vehicle 100 driver. For example, text and/or images can be projected on the road by selectively reflecting light back into the optical system and redirecting it.

FIG. 7A illustrates a cross-sectional diagram of a reflector-based optics headlight 101 with a light guide device 105 (e.g., a liquid crystal scattering or recycling device) and improved light pattern 107 of dispersed light in accordance with an example embodiment. FIGS. 7B and 7C illustrate, respectively, a perspective view of the reflector-based optics headlight 101, and a front view of the light guide device 105 in FIG. 7A. The headlight 101 has a housing 130 that is configured and used as a reflector (e.g., multiple mirrors), and a light bulb 103 and optional high beam filament 104. The light emitted from the bulb 103 strikes the housing reflector's sides and the reflector is shaped to direct reflected light rays toward the light guide device 105. Segments 117 in the light guide device 105 are controlled in accordance with an example embodiment to output light rays inputted thereto in accordance with a selected state. Segments determined to emit light that can cause glare on an oncoming vehicle 102 driver are controlled to operate in an output state that reduces glare (e.g., a scattered output state, or a reflective output state). The remaining segments are controlled by the addressing matrix in the light guide device 105 to operate in an output state for vehicle 100 driver visibility (e.g., a focused output state, or a clear output state). The improved light pattern 107 to reduce glare shown in FIG. 7A comprises light rays outputted from an upper region of the light guide device 105 being scattered or reflected 109 to reduce glare while light rays outputted from a lower region of the light guide device 105 are emitted as focused or collimated light 108 (e.g., to better illuminate the road for the vehicle 100 driver), or simply as light rays from the light source 103 permitted to pass through the light guide device 105 segments operated in a clear state. The number of segments operated across the width dimension of the light guide device 105 (not shown in FIG. 7A) depends on the desired light pattern 107 and the detected profile of the glare coming from an oncoming vehicle 102. The light pattern 107 described with reference to FIG. 7A is for illustrative purposes, and it is to be understood that different segments in the light guide device 105 can be controlled to emit a different light pattern 107.

Figure 8A:
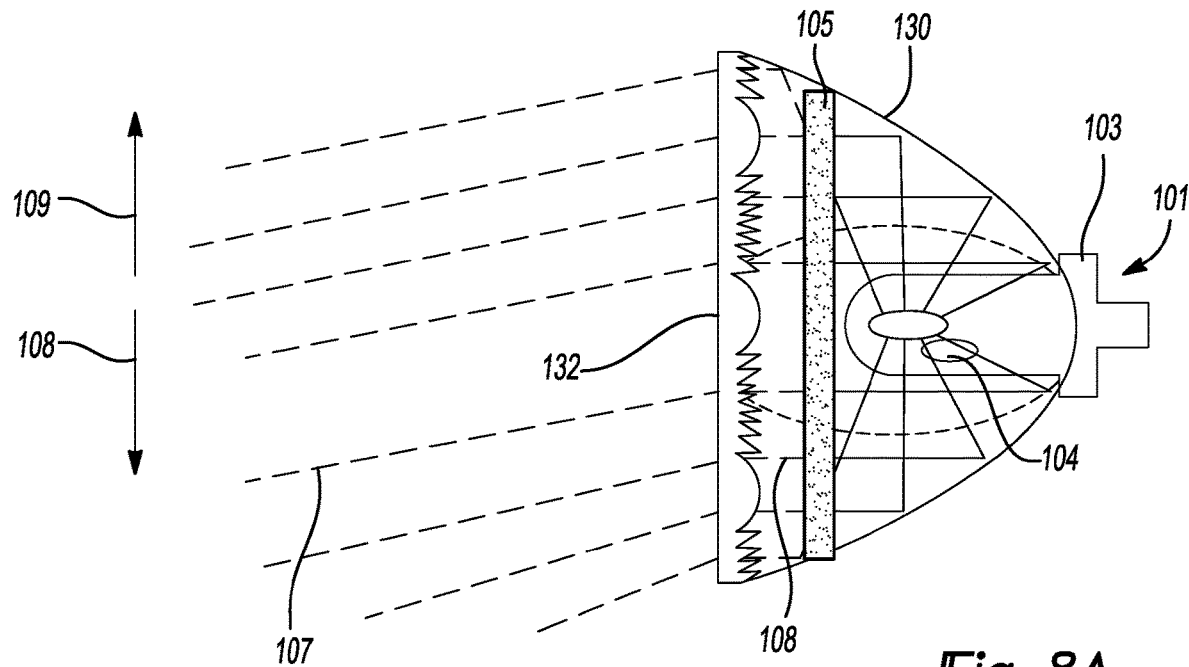
FIG. 8A illustrates a cross-sectional diagram of a lens-based optics headlight with a light guide device and improved light pattern in accordance with an example embodiment.
Figure 8B:
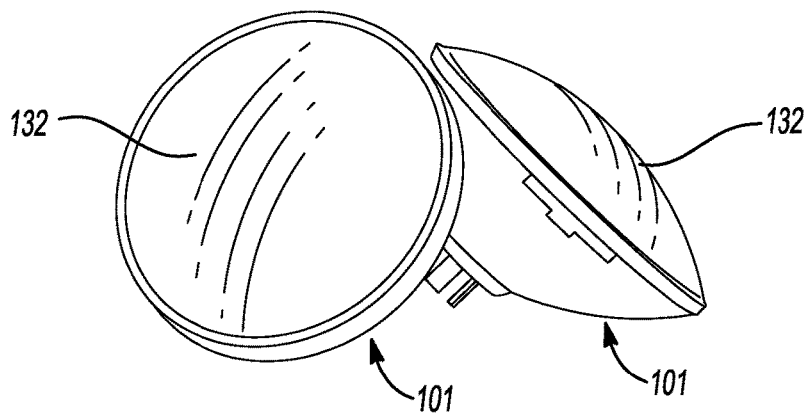
FIGS. 8B and 8C illustrate, respectively, a perspective view of the lens-based optics headlight, and a front view of the light guide device in FIG. 8A.
Figure 8C:
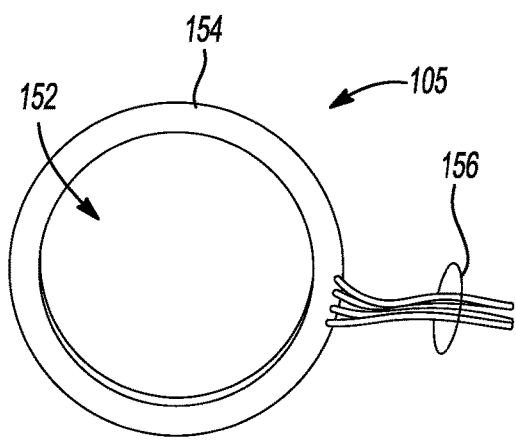

FIG. 8A illustrates a cross-sectional diagram of a lens-based optics headlight 101 with a light guide device 105 and improved light pattern 107 in accordance with an example embodiment. FIGS. 8B and 8C illustrate, respectively, a perspective view of the lens-based optics headlight 101, and a front view of the light guide device 105 in FIG. 8A. The headlight 101 has a housing 130 that is configured and used as a reflector (e.g., a parabolic reflector), a light bulb 103, an optional high beam filament 104, and a lens 132. The light emitted from the bulb 103 strikes the housing reflector's sides and the reflector is shaped to direct reflected light rays toward the light guide device 105. Segments 117 in the light guide device 105 are controlled in accordance with an example embodiment to output light rays inputted thereto in accordance with a selected state to reduce glare as needed as described with reference to FIG. 7A.

Figure 9A:
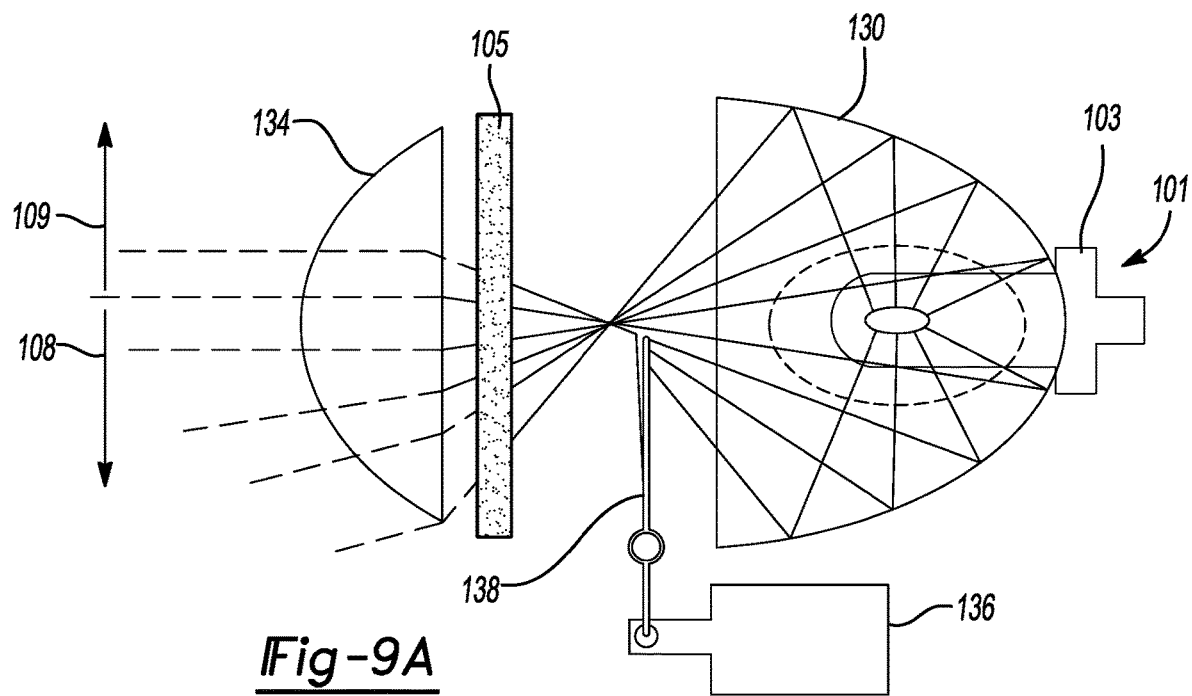
FIG. 9A illustrates a cross-sectional diagram of a projector-type optics headlight with a light guide device and improved light pattern in accordance with an example embodiment.
Figure 9B:
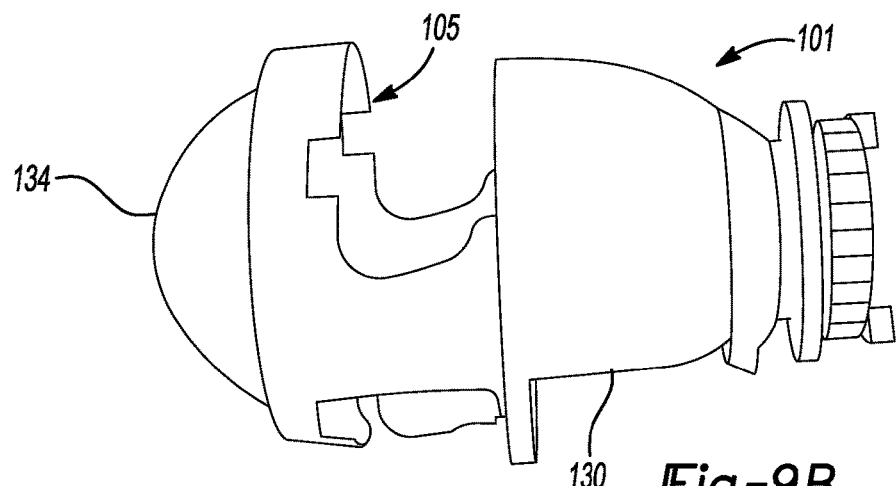
FIGS. 9B and 9C illustrate, respectively, a perspective view of the projector-type optics headlight, and a front view of the light guide device in FIG. 9A.
Figure 9C:
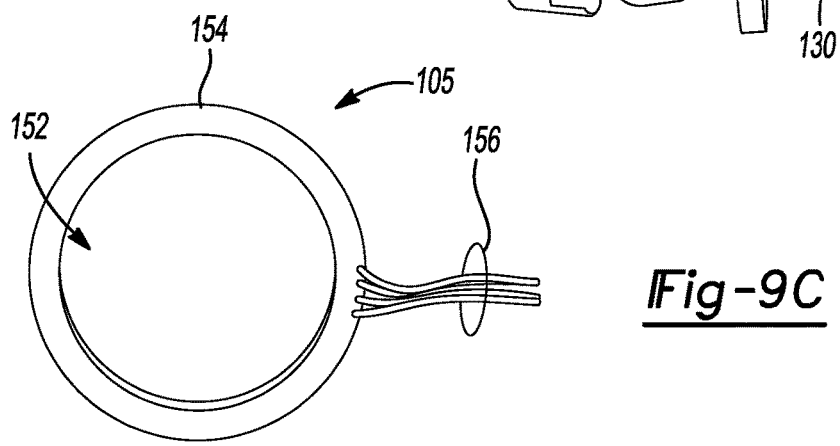

FIG. 9A illustrates a cross-sectional diagram of a projector-type optics headlight 101 with a light guide device 105 and improved light pattern 107 in accordance with an example embodiment. FIGS. 9B and 9C illustrate, respectively, a perspective view of the projector-type optics headlight 101, and a front view of the light guide device 105 in FIG. 9A. The headlight 101 has a housing 130 that is configured and used as a reflector (e.g., elliptical), a light bulb 103, an optional solenoid 136 for dimming and brightening, a shield 138 disposed near the image plane, and a projector lens 134. The light emitted from the bulb 103 strikes the reflector's sides, and the housing reflector 130 and shield 138 are configured to focus the light outputted therefrom toward the lens 134 and through the light guide device 105. Segments 117 in the light guide device 105 are controlled in accordance with an example embodiment to output light rays inputted thereto in accordance with a selected state to reduce glare as needed as described with reference to FIG. 7A.

Figure 10A:
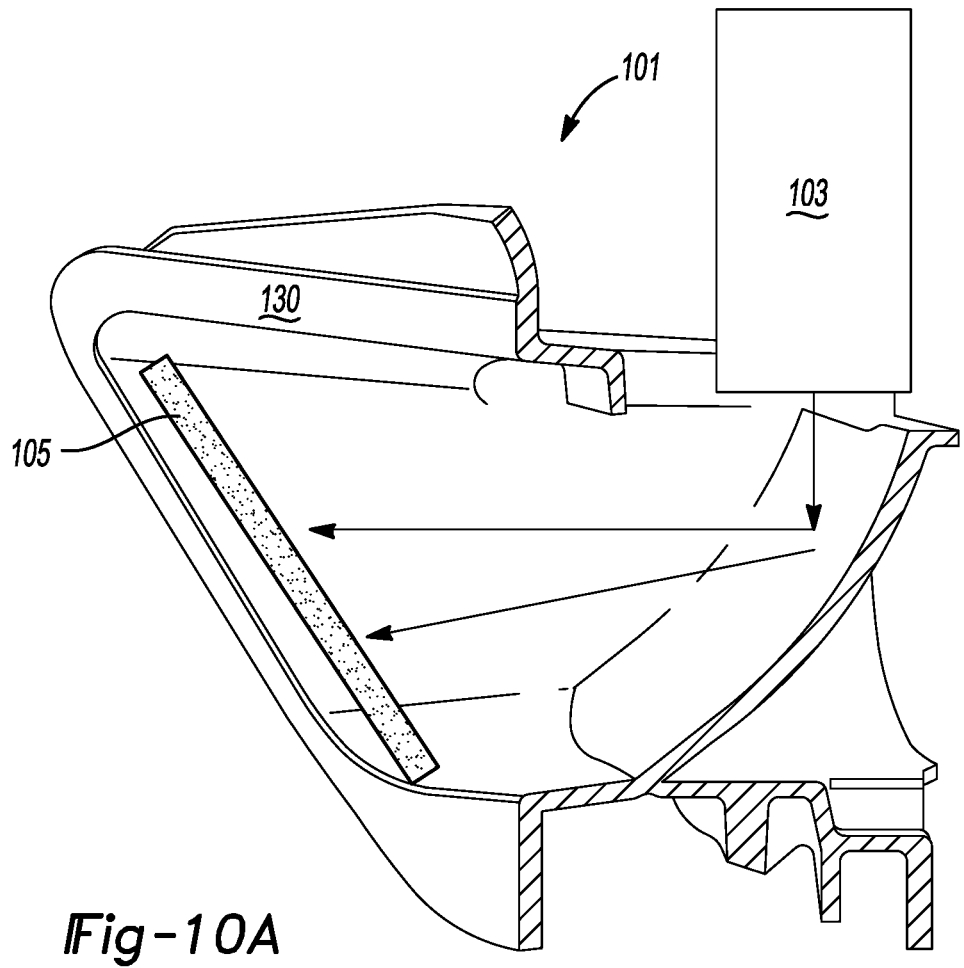
FIG. 10A illustrates a cross-sectional diagram of a laser-type optics headlight with a light guide device for an improved light pattern in accordance with an example embodiment.
Figure 10B:
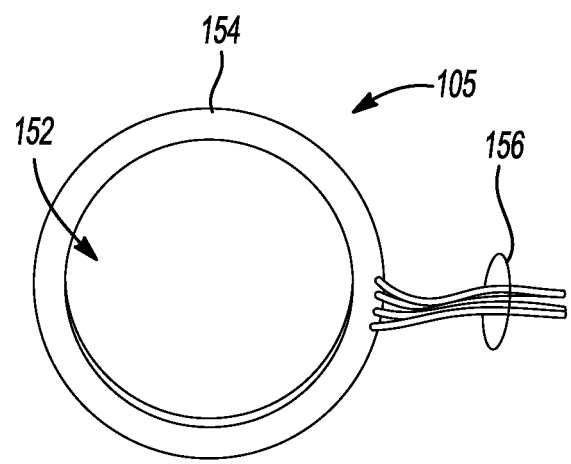
FIG. 10B illustrates a front view of the light guide device in FIG. 10A.

FIG. 10A illustrates a cross-sectional diagram of a laser-type optics headlight 101 with a light guide device 105 for an improved light pattern 107 in accordance with an example embodiment. FIG. 10B illustrates a front view of the light guide device 105 in FIG. 10A. The headlight 101 has a housing 130 that is configured and used as a reflector, and a laser light source 103. The light emitted from the laser 103 strikes the reflector's sides, and the housing and laser are configured to focus the light outputted therefrom toward the light guide device 105. Segments 117 in the light guide device 105 are controlled in accordance with an example embodiment to output light rays inputted thereto in accordance with a selected state to reduce glare as needed as described with reference to FIG. 7A.

Figure 11A:
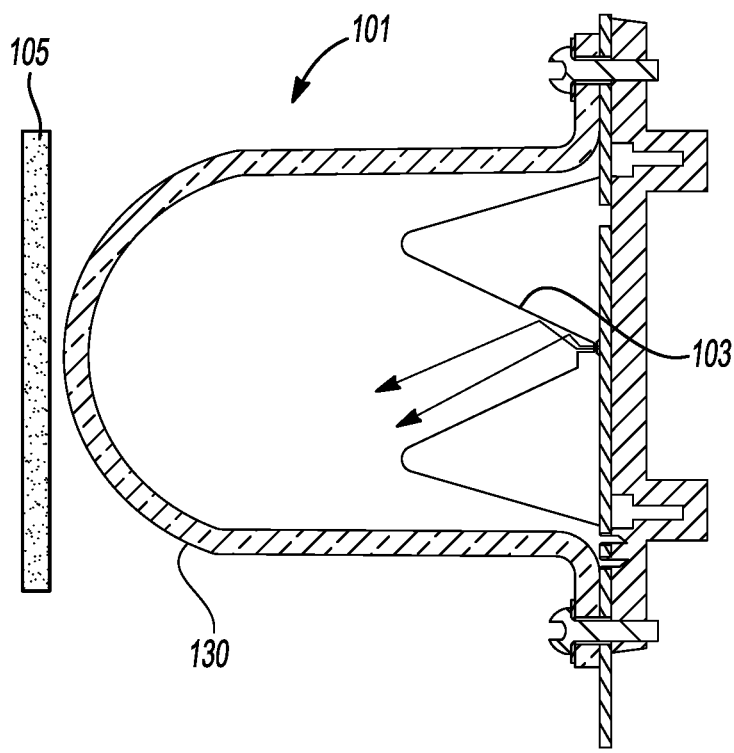
FIG. 11A illustrates a cross-sectional diagram of a D-optic LED-type headlight with a light guide device for an improved light pattern in accordance with an example embodiment.
Figure 11B:
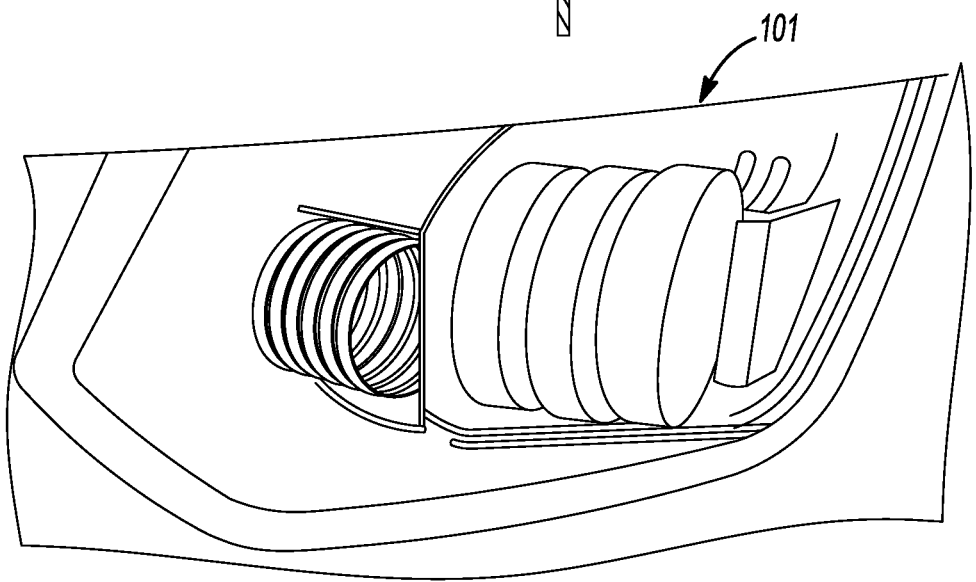
FIGS. 11B and 11C illustrate, respectively, a perspective view of the D-optic LED-type headlight, and a front view of the light guide device in FIG. 11A.
Figure 11C:
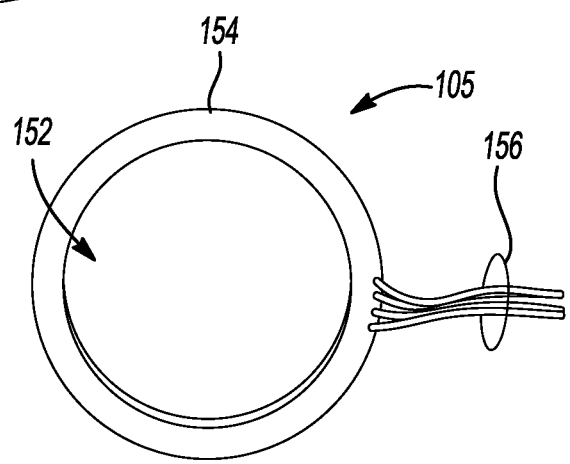
Figure 12:
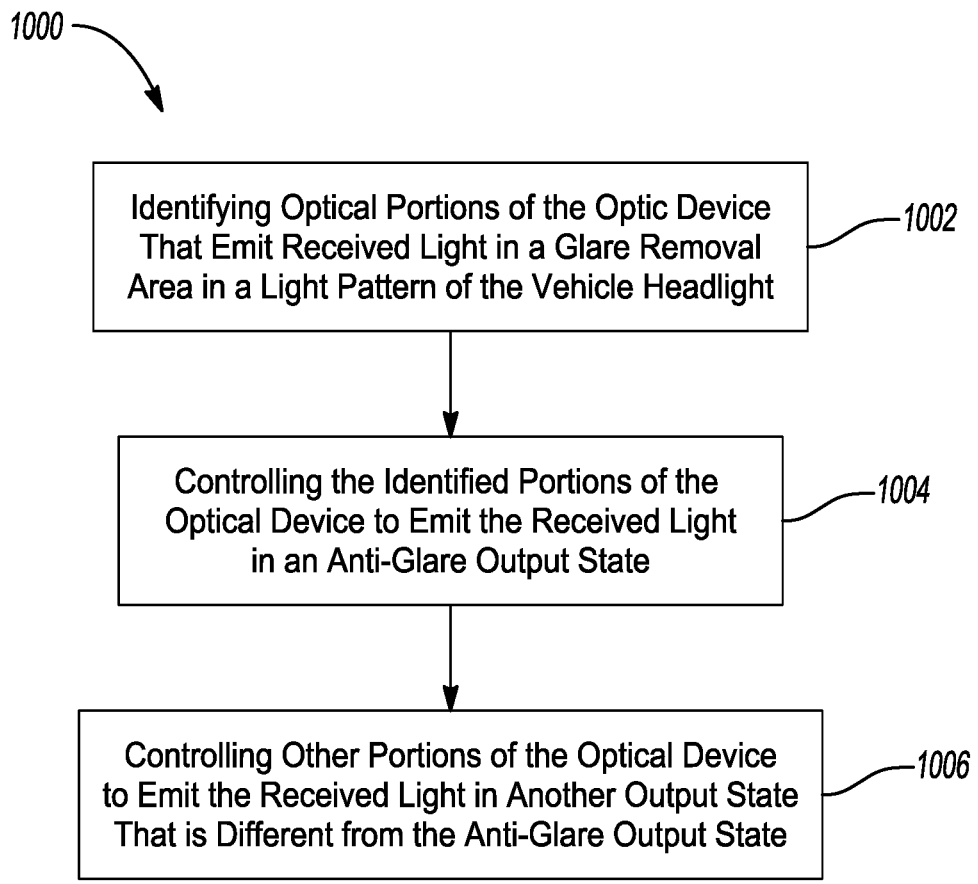
FIG. 12 is an illustrative example of a method of controlling an optical device for a vehicle headlight, in accordance with an example embodiment of the present disclosure.

FIG. 11A illustrates a cross-sectional diagram of a D-optic LED-type headlight 101 with a light guide device 105 for an improved light pattern 107 in accordance with an example embodiment. FIGS. 11B and 11C illustrate, respectively, a perspective view of the D-optic LED-type headlight, and a front view of the light guide device in FIG. 11A. The housing 130 of the headlight 101 has at least one addressable LED array 103 that is optically coupled with a liquid crystal lens (e.g., that has an array of microlenses). For example, precision lenses are closely paired with corresponding LEDs, and multiple LEDs formed into a specific light pattern. The light emitted from the LEDs are outputted via the lens toward segments 117 in the light guide device 105. The LEDs and microlenses can have a one-to-one or many-to-one relationship with the segments 117. Segments 117 in the light guide device 105 are controlled in accordance with an example embodiment to output light rays inputted thereto in accordance with a selected state to reduce glare as needed as described with reference to FIG. 7A. Alternatively, the D-optic LED-type headlight 101 can be operated without a light guide device 105, and instead selectively control the LED array and/or the microlenses array to operate in a selected output mode for glare reduction or in another output mode for vehicle 100 driver visibility. For example, the LED headlight 101 can be configured to operate some of the LEDs that are determined would project on an oncoming vehicle 102 in a scattered output mode. These LEDs remove glare, since it is scattered light, but still illuminate. The remaining LEDs are controlled to focus/collimate their light rays since doing to would not contribute any glare on an oncoming vehicle 102 driver Embodiments of the present disclosure can improve a vehicle headlight 101 by providing a segmented light guide device 105 in which segments 117 are selectively controlled to operate in an output state that reduces glare to oncoming vehicle 102 drivers. Vehicle sensors and controller circuitry are used to identify areas of glare removal in the light pattern 107 of the headlight 101 and control the corresponding segments 107 in the light guide device 105 to operate in a selected light output state that reduces glare. The segments 117 can be operated in a focused output state for vehicle 100 driver visibility, or in a scattered output state to reduce glare to oncoming vehicle 102 drivers. The segments 117 can be operated in a clear or transparent output state for vehicle 100 driver visibility, or in a reflected output state to reduce glare to oncoming vehicle 102 drivers. Reflected light can optionally be re-directed. The light guide device 105 can employ bi-stable liquid crystal shuttering or liquid crystal switchable mirror technology. Illustrative embodiments described herein that scatter light, or reflect and recycle light, are advantageous to a different anti-glare technique that directs light away from an oncoming vehicle 102, thereby reducing illumination and potentially causing poor visibility for the vehicle 100 driver.

Now referring to FIGS. 12 and 13A-13C, in addition to FIGS. 1 to 11C, there is illustratively shown a method 1000 of operating a vehicle headlight 100, the vehicle headlight 100 including an optical device configured to transform the state of light received from a light source. The optical device may include light scattering structures that scatter the light from the light source. For example, the optical device may be the segmented liquid crystal light guide device 105 placed in the optical path of the light source 103 in the vehicle headlight 101 where the segmented liquid crystal light guide device 105 includes segments 117 that receive light from the light source as described in more detail herein above. Other types of optical devices for altering the character/changing or transforming the state of the received light by operating in difference states between a glare removal state and a non-glare removal state may be provided. For example, where the optical device is operating in the glare removal state, the light may be dimmed, or blocked, or scattered, or focused/collimated, by the optical device. The method 1000 is illustratively shown in FIG. 12 as including the steps of identifying optical portions of the optic device that emit received light in a glare removal area in a light pattern 107 of the vehicle headlight 1002, such as for example identifying segments (e.g., the group of segments 117 indicated generally at 117a in FIGS. 13A-13C) in the segmented liquid crystal light guide device 105 that emit received light in a glare removal area 109 in a light pattern 107 of the vehicle headlight, and controlling the identified portions 117a of the optical device 105 to emit the received light in an anti-glare output state 1004. For example, the method 1000 can involve controlling the identified segments indicated generally at 117a in FIGS. 13A-13C to emit the received light in an anti-glare output state, and controlling other portions of the optical device (e.g., segments indicated generally at 117b in FIGS. 13A-13C) to emit the received light in another output state that is different from the anti-glare output state 1006, for example by controlling the other ones of the segments in the segmented liquid crystal light guide device to emit the received light in another output state that is different from the anti-glare output state. For example, the group of segments indicated at 117b can be controlled to provide focused, collimated light 108. FIGS. 13A, 13B and 13C illustrate example changes in the operation of respective pixels or segments 117 in an optic device (e.g., light guide device 105) operating in a scatter mode to normal mode as a vehicle 102 passes by from another direction (e.g. sensed using the light sensor 115 in the same vehicle 100 with the matrix of segments 117). The light lobe indicated at 109 is emitted from respective pixels or segments 117 in the group indicated at 117a in the matrix operating in a scatter mode. This projected scattered light 109 generally illuminates the front of the oncoming vehicle 102 where less glare is desired (e.g. the windshield), whereas the rest of the light (e.g., light lobe 108) fully illuminates the other areas. As the oncoming vehicle 102 passes the vehicle 100, the respective pixels or segments 117 in the groups of segments 117a and 117b changes as the number of segments or pixels 117 in the scatter mode changes.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A vehicle headlight, comprising:
    a light source including an array of light elements that are each individually controllable and configured to generate light; and
    a segmented light guide device in which segments receive light from the light source and are individually controllable to selectively operate in one of at least two output states to emit light from the vehicle headlight, the output states chosen from an anti-glare output state and another output state that is different from the anti-glare output state,
    wherein the light source is disposed behind the segmented light guide, and
    wherein the segments in the segmented light guide are each configured to reflect received light when in the anti-glare output state, and to emit the received light when in the other output state.

2. The vehicle headlight of claim 1, wherein the segmented light guide is configured to reflect the received light as scattered light when in the anti-glare output state, and to emit the received light as collimated light when in the other output state.

3. The vehicle headlight of claim 1, wherein the segmented light guide device comprises liquid crystal material between two transparent substrates that can reflect the received light in the anti-glare output state when subjected to a first voltage level, and emit the received light in the other output state when subjected to a different second voltage level.

4. The vehicle headlight of claim 3, wherein the segments are arranged in a matrix by an addressing matrix of electrodes, the addressing matrix being operable to supply any respective one of the segments with a voltage level chosen from the first voltage level and the second voltage level depending on whether a signal is received that indicates that received light emitted from that segment is in a glare removal area identified in a light pattern produced by the headlight.

5. The vehicle headlight of claim 3, wherein segments in the segmented light guide are each configured to reflect the received light as scattered light when in the anti-glare output state, and to emit the received light as collimated light when in the other output state.

6. The vehicle headlight of claim 1, wherein the segmented light guide is configured to redirect reflected light for emission toward an area in the light pattern produced by the headlight that is outside the glare removal area.

7. The vehicle headlight of claim 1, wherein the light source is chosen from a light bulb, a laser, and an array of light emitting diodes.

8. The vehicle headlight of claim 1, wherein the segmented light guide is configured to allow light generated by the light source to pass through the segmented light guide in the other output state.

9. The vehicle headlight of claim 1, further comprising a reflector for reflecting the light generated by the light source;
    wherein the segmented light guide is configured reflect the received light towards the reflector when in the anti-glare output state, and to allow the received light to pass therethrough in the other output state; and
    wherein the received light includes: light from the light source reflected once by the reflector, and recycled light reflected by the segmented light guide in the anti-glare output state.

10. A method of operating a vehicle headlight, comprising:
    placing a segmented liquid crystal light guide device in the optical path of a light source in the vehicle headlight, the light source including an array of light elements, the segmented liquid crystal light guide device having segments that receive light from the light source;
    identifying individual segments in the segmented liquid crystal light guide device that emit received light in a glare removal area in a light pattern of the vehicle headlight;
    controlling the identified segments individually to reflect the received light in an anti-glare output state, and controlling other ones of the segments in the segmented liquid crystal light guide device to emit the received light in another output state that is different from the anti-glare output state; and
    controlling, individually, the light elements of the light source to output the light therefrom.

11. The method of claim 10, further comprising emitting the received light as scattered light when in the anti-glare output state, and as collimated light when in the other output state.

12. The method of claim 10, further comprising redirecting the reflected light for emission toward an area in the light pattern produced by the vehicle headlight that is outside the glare removal area.

13. A method of operating a vehicle headlight, the vehicle headlight including an optical device configured to transform the state of light received from a light source including an array of light elements, the method including:
    identifying individual optical portions of the optical device that emit received light in a glare removal area in a light pattern of the vehicle headlight;
    controlling the identified individual optical portions of the optical device to reflect the received light in an anti-glare output state;
    controlling other portions of the optical device to emit the received light in another output state that is different from the anti-glare output state; and
    controlling, individually, the light elements of the light source to output light therefrom,
    wherein the light source is disposed behind the optical device.

14. The method of claim 13, further comprising reflecting the received light as scattered light when in the anti-glare output state, and as collimated light when in the other output state.

15. The method of claim 13, further comprising redirecting the reflected light for emission toward an area in the light pattern produced by the vehicle headlight that is outside the glare removal area.

* * * * *